(12) United States Patent
Farris et al.

(10) Patent No.: US 11,702,950 B2
(45) Date of Patent: Jul. 18, 2023

(54) SEAL COATING

(71) Applicant: United Technologies Corporation, Farmington, CT (US)

(72) Inventors: John R. Farris, Bolton, CT (US); Michael G. McCaffrey, Windsor, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 977 days.

(21) Appl. No.: 16/388,219

(22) Filed: Apr. 18, 2019

(65) Prior Publication Data

US 2020/0025014 A1 Jan. 23, 2020

Related U.S. Application Data

(62) Division of application No. 14/883,289, filed on Oct. 14, 2015, now abandoned.

(Continued)

(51) Int. Cl.
| | |
|---|---|
| *F01D 11/12* | (2006.01) |
| *B05D 3/00* | (2006.01) |
| *F01D 25/00* | (2006.01) |
| *C23C 4/01* | (2016.01) |
| *C23C 28/04* | (2006.01) |

(Continued)

(52) U.S. Cl.
CPC .............. *F01D 11/12* (2013.01); *B05D 3/007* (2013.01); *C23C 4/01* (2016.01); *C23C 4/11* (2016.01); *C23C 4/18* (2013.01); *C23C 28/042* (2013.01); *F01D 11/122* (2013.01); *F01D 25/005* (2013.01); *F05D 2240/11* (2013.01);

(Continued)

(58) Field of Classification Search
CPC ...................................................... C23C 4/18
See application file for complete search history.

(56) References Cited

U.S. PATENT DOCUMENTS

| 4,257,735 A | * | 3/1981 | Bradley | ................ F16J 15/445 |
| | | | | 277/303 |
| 4,289,447 A | | 9/1981 | Sterman et al. | |

(Continued)

FOREIGN PATENT DOCUMENTS

EP 2395129 A1 12/2011

OTHER PUBLICATIONS

Extended European Search Report for EP Application No. 15189695.8, dated May 30, 2016, 9 pages.

*Primary Examiner* — Robert A Vetere
(74) *Attorney, Agent, or Firm* — Kinney & Lange. P.A.

(57) ABSTRACT

A method of forming a coating includes disposing a substrate having a plurality of protrusions on a seal and layering a topcoat over the protrusions. The method of forming a coating also includes creating a wear pattern and converting the topcoat. A turbine section includes a casing, a plurality of blades within the casing, and a substrate deposited on the casing having a plurality of protrusions. The turbine also includes an unconverted topcoat disposed over the plurality of protrusions, the topcoat having segmented portions defining a plurality of faults extending from the protrusions through the topcoat. A method of forming a coating includes creating a channel in the coating during an initial rub event and converting the coating during a high-temperature event. Converting the coating includes preserving the channel created during the initial rub event.

6 Claims, 6 Drawing Sheets

Related U.S. Application Data

(60) Provisional application No. 62/091,998, filed on Dec. 15, 2014.

(51) Int. Cl.
*C23C 4/18* (2006.01)
*C23C 4/11* (2016.01)

(52) U.S. Cl.
CPC .... *F05D 2250/294* (2013.01); *F05D 2300/20* (2013.01); *Y02T 50/60* (2013.01)

(56) References Cited

U.S. PATENT DOCUMENTS

| | | |
|---|---|---|
| 5,434,210 A | 7/1995 | Rangaswamy et al. |
| 6,102,656 A | 8/2000 | Nissley et al. |
| 6,358,002 B1 * | 3/2002 | Good .................. F01D 11/122 415/174.4 |
| 6,457,939 B2 | 10/2002 | Ghasripoor et al. |
| 8,007,899 B2 | 8/2011 | Freling et al. |
| 8,100,640 B2 | 1/2012 | Strock et al. |
| 8,506,243 B2 | 8/2013 | Strock et al. |
| 8,535,783 B2 | 9/2013 | Lutjen et al. |
| 2001/0004436 A1 * | 6/2001 | Chasripoor .......... F01D 11/122 415/174.4 |
| 2009/0110536 A1 | 4/2009 | Strock et al. |
| 2011/0116920 A1 * | 5/2011 | Strock .................. F01D 11/08 428/600 |

* cited by examiner

SEAL COATING

CROSS-REFERENCE TO RELATED APPLICATION(S)

This application is a divisional of U.S. application Ser. No. 14/883,289 filed Oct. 14, 2015 for "Seal Coating" by John R. Farris and Michael G. McCaffrey, which claims the benefit of U.S. Provisional Application No. 62/091,998 filed Dec. 15, 2014 for "Seal Coating" by John R. Farris and Michael G. McCaffrey.

STATEMENT OF GOVERNMENT INTEREST

This invention was made, at least in part, with U.S. government support under contract number FA8650-09-D-2923-0021, awarded by the U.S. Air Force. The U.S. government may have certain rights in this invention.

BACKGROUND

The present disclosure relates generally to gas turbine engines and, more particularly, to turbine blade outer air seals (BOAS). Specifically, the disclosure concerns coatings applied to turbine blade sealing structures.

BOAS seal turbine gas path air between the rotating blades of the turbine and the gas path surface of the BOAS. The distance between the tip of the blades and the surface of the BOAS greatly impacts turbine efficiency. Accordingly, efforts have been made to reduce the distance between the blade tips and the BOAS as much as possible. Typically, gas turbine engines allow the blade to rub up against a ceramic-coated BOAS during operation, creating wear on either the blade tip, the BOAS surface, or both. With a thermally insulating ceramic coating on the BOAS, the blade usually takes most of the wear.

Current methods of resolving blade wear issues involve making the ceramic coating abradable and, therefore, more likely to wear. However, abradable ceramic coatings are more susceptible to erosion from debris in the gas path, and tip clearance increases as the surface is worn away, thereby decreasing engine efficiency. Moreover, the extremely high temperatures in the gas path cause the abradable ceramic coatings to break down and detach from the BOAS. The blade tip can also strike the surface and melt, with the resulting molten material increasing blade tip clearance, resulting in loss of engine efficiency.

SUMMARY

A method of forming a coating includes disposing a substrate having a plurality of protrusions on a seal and depositing a topcoat over the protrusions. The method of forming a coating also includes creating a wear pattern and converting the topcoat.

A turbine section includes a casing, a plurality of blades within the casing, and a substrate deposited on the casing having a plurality of protrusions. The turbine also includes an unconverted topcoat disposed over the plurality of protrusions, the topcoat having segmented portions defining a plurality of faults extending from the protrusions through the topcoat.

A method of forming a coating includes creating a channel in the coating during an initial rub event and converting the coating during a high-temperature event. Converting the coating includes preserving the channel created during the initial rub event.

DETAILED DESCRIPTION

Figure 1:
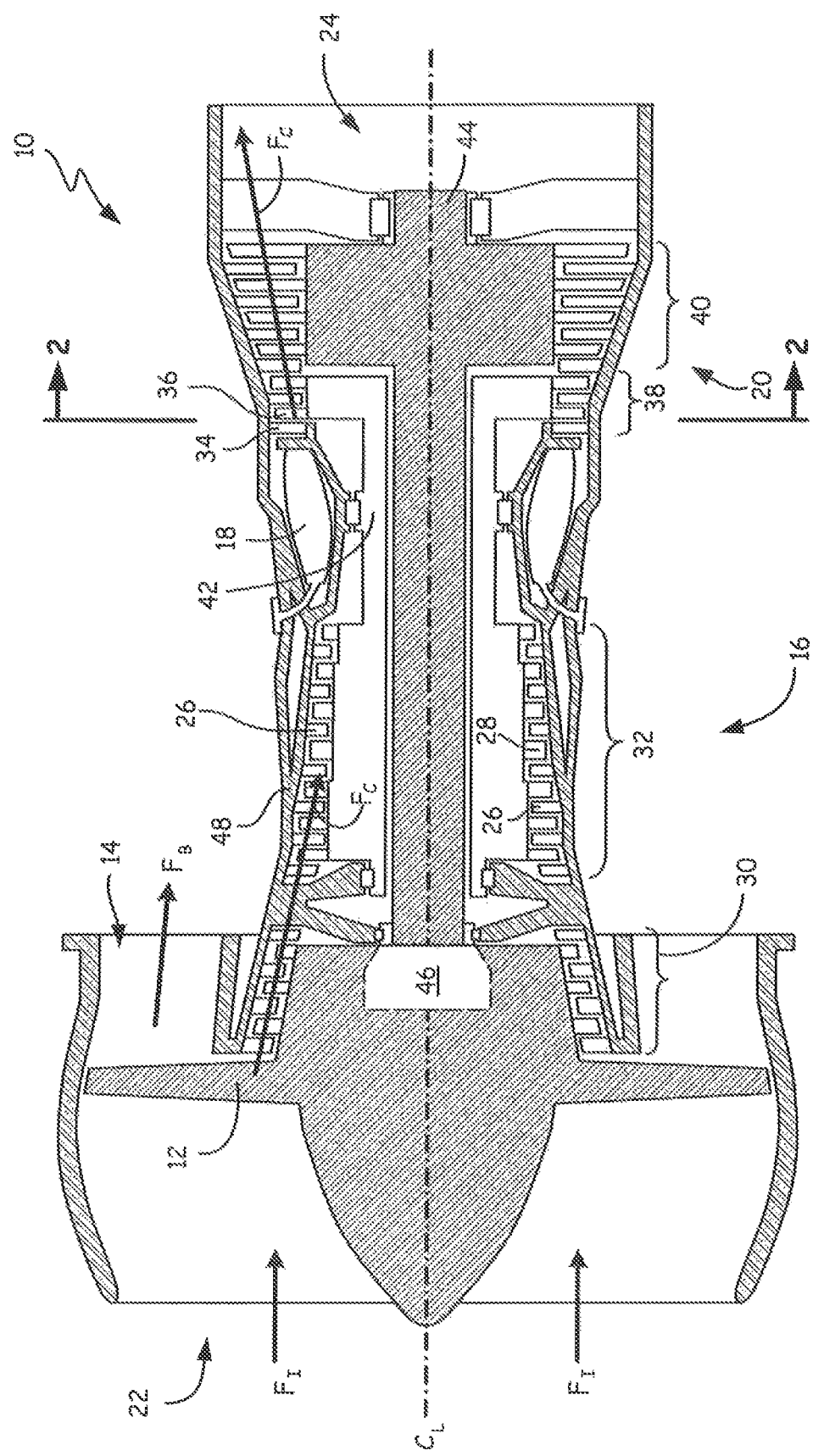
FIG. 1 is a simplified cross-sectional view of a standard gas turbine engine.

FIG. 1 is a simplified cross-sectional view of an exemplary gas turbine engine 10 in accordance with embodiments of the present disclosure. Turbine engine 10 includes fan 12 positioned in bypass duct 14. Turbine engine 10 also includes compressor section 16, combustor (or combustors) 18, and turbine section 20 arranged in a flow series with upstream inlet 22 and downstream exhaust 24.

Compressor 16 includes stages of compressor vanes 26 and blades 28 arranged in low pressure compressor (LPC) section 30 and high pressure compressor (HPC) section 32. Turbine section 20 includes stages of turbine vanes 34 and turbine blades 36 arranged in high pressure turbine (HPT) section 38 and low pressure turbine (LPT) section 40. HPT section 38 is coupled to HPC section 32 via HPT shaft 42, forming the high pressure spool. LPT section 40 is coupled to LPC section 30 and fan 12 via LPT shaft 44, forming the low pressure spool. HPT shaft 42 and LPT shaft 44 are typically coaxially mounted, with the high and low pressure spools independently rotating about turbine axis (centerline) $C_L$.

Fan 12 includes a number of fan airfoils circumferentially arranged around a rotating member, which is coupled to LPC section 30 and driven by LPT shaft 44. In some embodiments, fan 12 is coupled to the fan spool via geared fan drive mechanism 46, providing independent fan speed control. In some embodiments, fan 12 is forward-mounted and provides thrust by accelerating flow downstream through bypass duct 14, for example in a high-bypass configuration suitable for commercial and regional jet aircraft operations. In other embodiments, fan 12 is an unducted fan or propeller assembly, in either a forward- or aft-mounted configuration. In these various embodiments, turbine engine 10 includes any of a high-bypass turbofan, a low-bypass turbofan, or a turboprop engine, and the number of spools and shaft configurations may vary.

During the operation of turbine engine 10, incoming airflow $F_I$ enters inlet 22 and divides into core flow $F_C$ and bypass flow $F_B$, downstream of fan 12. Core flow $F_C$ continues along the core flowpath through compressor section 16, combustor 18, and turbine section 20, and bypass flow $F_B$ proceeds along the bypass flowpath through bypass duct 14.

LPC section 30 and HPC section 32 of compressor 16 compress incoming air for combustor 18, where fuel is introduced, mixed with air, and ignited to produce hot combustion gas. Depending on the embodiment, fan 12 can also provide some degree of compression to core flow $F_C$, and LPC section 30 may be omitted. Alternatively, an additional intermediate spool can be included, for example in a three-spool turboprop or turbofan configuration.

Combustion gas exits combustor 18 and enters HPT section 38 of turbine 20, encountering turbine vanes 34 and turbines blades 36. Turbine vanes 34 turn and accelerate the flow of combustion gas, and turbine blades 36 generate lift for conversion to rotational energy via HPT shaft 42, which drives HPC section 32 of compressor 16. Partially expanded combustion gas transitions from HPT section 38 to LPT section 40, driving LPC section 30 and fan 12 via LPT shaft 44. Exhaust flow exits LPT section 40 and turbine engine 10 via exhaust nozzle 24. In this manner, the thermodynamic efficiency of turbine engine 10 is tied to the overall pressure ratio, as defined between the delivery pressure at inlet 22 and the compressed air pressure entering combustor 18 from compressor section 16. In general, a higher pressure ratio offers increased efficiency and improved performance. It will be appreciated that various other types of turbine engines can be used in accordance with the embodiments of the present disclosure.

Figure 2:
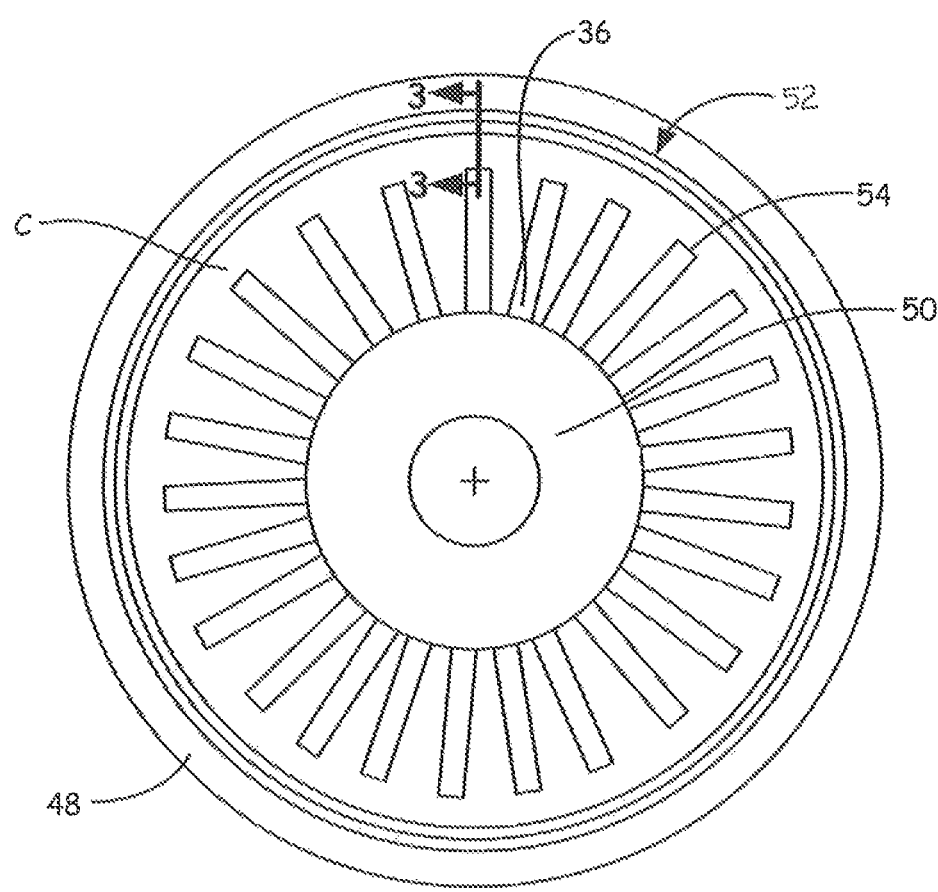
FIG. 2 is a simplified cross-sectional view illustrating the relationship between a blade outer air seal and blade tips taken along the line 2-2 of FIG. 1, not to scale.
Figure 3:
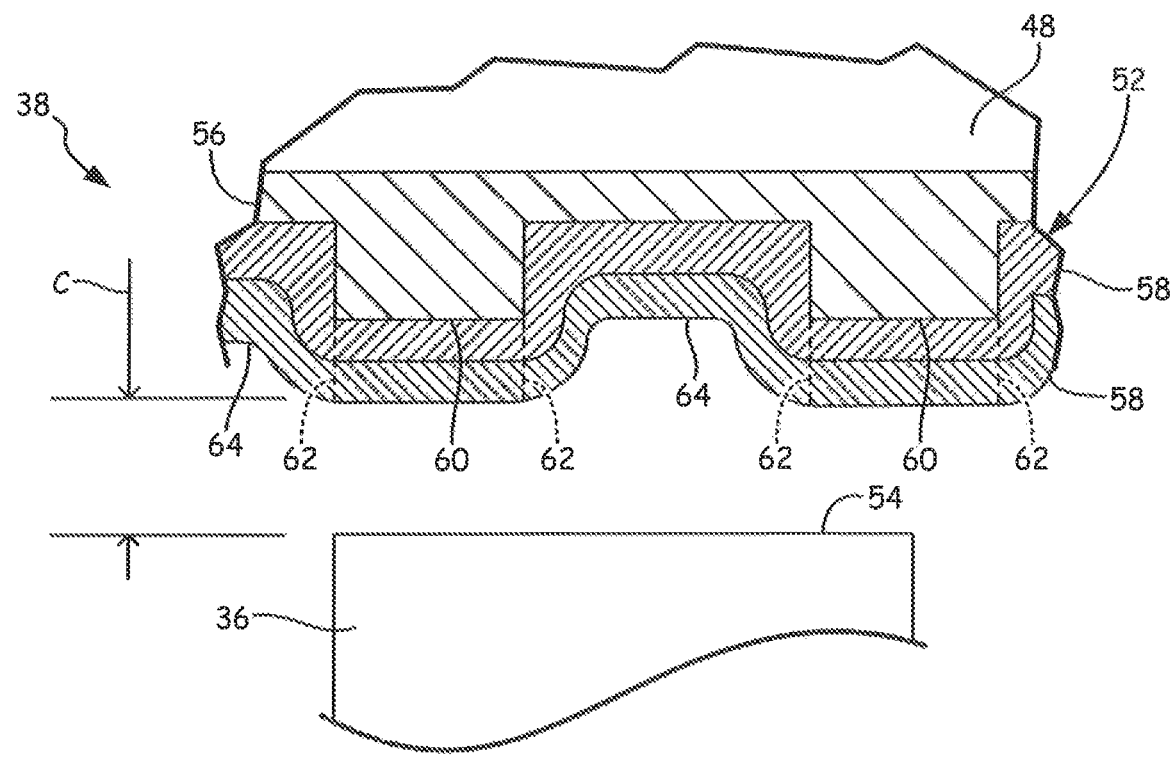
FIG. 3 is a cross-sectional view of a high pressure turbine taken along the line 3-3 of FIG. 2, not to scale.

FIG. 2 is a simplified cross-sectional view along the line 2-2 of FIG. 1 of casing 48 having rotor shaft 50. Blades 36 are attached to rotor shaft 50, and the gas path is shown as the space between blades 36. As shown in FIG. 3, topcoat 52, corresponding to the coating of this disclosure, is on substrate 56, such that the clearance C between topcoat 52 (topcoat 52 includes insulating layers 58) and blade tips 54 of blades 36 serves as a seal to prevent leakage of air, thus improving engine efficiency. In FIG. 2, clearance C is enlarged for the purposes of illustration. In practice, clearance C can be, for example, in a range of about 0.025 inches (0.064 centimeters) to 0.055 inches (0.14 centimeters) when the engine is cold and 0.000 to 0.035 inches (0.09 centimeters) during engine operation, depending on the specific operating conditions and previous rub events that may have occurred. By making clearance C as small as practicable, the air leakage past the blade tip can be reduced, thereby improving the efficiency and performance of turbine engine 10.

FIG. 3 is a cross-sectional view of HPT section 38 along line 3-3 of FIG. 2 with blade tip 54 of blade 36 and topcoat 52. Topcoat 52 is attached to casing 48 via substrate 56, resulting in a clearance C between topcoat 52 and blade tip 54 of blade 36 that varies with operating conditions, as described herein. Substrate 56 can be any material suitable for forming a desired geometry between casing 48 and thermally insulating layers 58. In some embodiments, substrate 56 can be formed from a metal alloy, such as a nickel-based alloy, and affixed to casing 48 by welding or other suitable method. In other embodiments, substrate 56 can be additively manufactured to form the desired pattern. In other embodiments, a bond coat (not shown) can be used to facilitate bonding between substrate 56 and thermally insulating layers 58. The bond coat can include any type of bonding material suitable for attaching substrate 56 and thermally insulating layers 58.

Substrate 56 includes protrusions 60, which can be geometric surface features on substrate 56. Protrusions 60 extend into the gas flow path such that gaps are formed between adjacent protrusions. Protrusions 60 can be of substantially uniform height. The height of protrusions 60 can be at least 0.01 inches (0.025 centimeters), such that the gaps between protrusions 60 have some depth greater than the desired clearance C.

Topcoat 52 includes one or more thermally insulating layers 58 layered over protrusions 60. In the embodiment of FIG. 3, topcoat 52 includes two thermally insulating layers 58. In some other embodiments, thermally insulated layers 58 can include any number of layers formed from any number of materials. Thermally insulating layers 58 can be formed from any abradable material suitable for providing a desired heat resistance within the gas path such as ceramic or metallic materials. In some embodiments, the material can be a ceramic composite such as yttria-stabilized zirconia, hafnia, and/or gadolinia, gadolinia zirconate, molybdate, alumina, or combinations thereof. Thermally insulating layers 58 can include various porosities. Typical porosities in a sealing application range from 5 to 50% by volume. Thermally insulating layers 58 can be deposited on substrate 56 by any number of thermal spray processes, such as plasma spray, electron beam, high velocity oxygen fuel (HVOF), or cathodic arc. Thermally insulating layers 58 are in an unconverted, intermediate state when applied to substrate 56.

Protrusions 60 produce faults 62 in topcoat 52. The faults can be produced using any variety of different protrusions 60. For example, protrusions 60 can be cylindrical, rectangular, triangular, or any other three-dimensional shape. Protrusions 60 can have substantially uniform height, preferably at least 0.01 inches (0.25 centimeters). In the embodiment of FIG. 3, protrusions 60 form a grid pattern. In other embodiments, protrusions 60 form other patterns to create the desired faults 62 in topcoat 52. In this manner, topcoat 52 can have any surface pattern with dimples 64 formed between protrusions 60. Faults 62, running through topcoat 52 from protrusions 60, are bounded by segmented portions in topcoat 52. These segmented portions serve as separation points in thermally insulating layers 58 that reduce the transmission of thermally induced stresses from one region to another in topcoat 52, and further reduce the effect of the thermal and mechanical stresses from blade tip 54 during an initial break-in cycle (discussed in FIG. 4A).

Figure 4A:
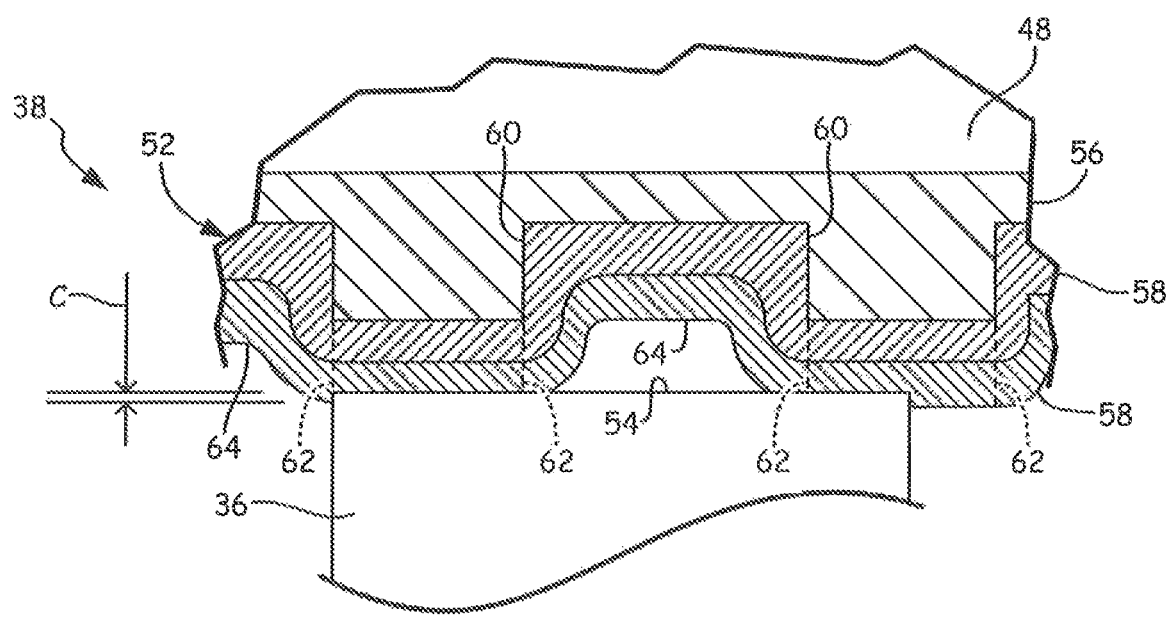
FIG. 4A is a cross-sectional view of the high pressure turbine of FIG. 3 during a first phase of a process to prepare an abradable, durable coating.
Figure 4B:
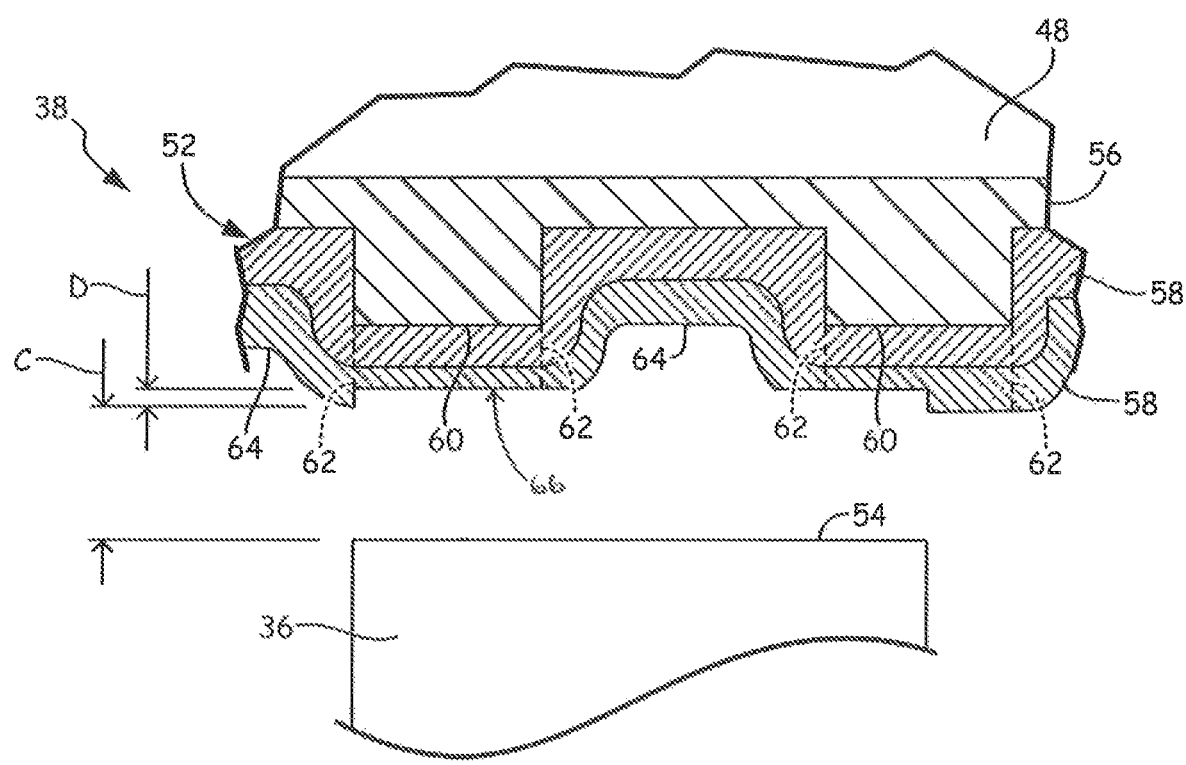
FIG. 4B is a cross-sectional view of the high pressure turbine of FIG. 4A after the first phase of the process to prepare an abradable, durable coating.

FIG. 4A is a cross-sectional view of HPT section 38 of FIG. 3 during a first phase of a process to prepare an abradable, durable coating on substrate 56. FIG. 4B is a cross-sectional view of HPT section 38 after the first phase of the process. Blade 36 of HPT section 38 is enclosed in casing 48. Substrate 56 is attached to casing 48. Substrate 56 includes protrusions 60, which extend outward from substrate 56 toward blade tip 54 of blade 36. Topcoat 52 is deposited on substrate 56. Topcoat 52 includes thermally insulating layers 58 layered over protrusions 60. Protrusions 60 form faults 62 extending from substrate 56 through topcoat 52.

In FIG. 4A, turbine engine 10 (not shown) is undergoing the first phase of a break-in cycle or green run. Typically, abradable coatings of a blade outer air seal (BOAS) are made from compositions that are easily worn down by the passing blade tip. These abradable coatings remain soft enough to allow the blade tip to cut into the coating during normal engine operation. In this manner, some of the wear that typically occurs to the blades is shared by the BOAS. Over time, however, the softer, abradable, coatings erode due to particles entering the turbine gas path. This erosion creates a larger clearance between the blade tip and BOAS. The larger the clearance between the blade tip and the BOAS, the less efficient the engine becomes.

Alternatively, if the BOAS coating hardness is increased to resist particle erosion, it typically becomes too hard for the blade tip to effectively wear the coating. As a result, the blade tip strikes the hard coating and melts due to friction. Molten material from the blade tips can then collect and build up on the BOAS coating surface, forming a dam or wall that further wears the blade tip.

In the present disclosure, topcoat 52 is installed in the turbine in a soft, unconverted state. During a green run of the turbine, the engine can be rapidly accelerated. That is, the engine can be run up to its maximum power in a very short time. This rapid acceleration causes blade tip 54 of blade 36 to rub topcoat 52. This initial rub creates channel 66 (described below in greater detail and shown in FIG. 4B) in topcoat 52 that corresponds to the wear pattern blade tip 54 will create in topcoat 52 over time during normal operation.

In a typical turbine having an abradable coating on the BOAS, after the initial rub, cracks can form due to thermal stresses, which can lead to spalling of the surface. The spalled surface increases the tip clearance, resulting in greater leakage and higher local temperatures. However, with protrusions 60 extending from substrate 56, topcoat 52 can be cut to depth D (described below in greater detail and shown in FIG. 4B) by blade tip 54 while remaining attached to substrate 56. Protrusions 60 create greater surface area between substrate 56 and topcoat 52 to hold topcoat 52 in place during rub events. Depth D can be less than the depth of the dimples 64 such that dimples 64 are not worn away by the initial rub.

Faults 62 created by protrusions 60 can cause topcoat 52 to be more easily cut in a desired pattern during the initial rub phase. In the embodiment of FIGS. 3, 4A, and 4B, protrusions 60 are substantially the same height, and substantially evenly spaced. In this arrangement, protrusions 60 form a dimpled surface when thermally insulating layers 58 are deposited over substrate 56. In other embodiments, protrusions 60 can take on any pattern that creates a desired fault pattern in topcoat 52. In this manner, a desired wear pattern can be formed in topcoat 52 after the BOAS has been installed in the turbine during a break-in cycle or green run.

In FIG. 4B, turbine engine 10 is undergoing the second phase of the break-in cycle. If topcoat 52 remained in its unconverted state after the first phase, it would be continually worn down by erosion. Thus, during the second phase of the break-in cycle, the surface of topcoat 52 is converted by a high-temperature event that hardens topcoat 52, converting topcoat 52 into a durable surface while preserving channel 66. Channel 66 can thereby retain a channel depth D for longer over the life of the engine because the converted coating is more resistant to particle erosion.

Depending on the composition of the topcoat, surface temperatures above 1950° F. (1066° C.) can cause conversion. The temperature at which the engine is run during the second phase of the break-in cycle can vary depending on the composition of thermally insulating layers 58. In this manner, topcoat 52 is run through a two-phase break-in process to create a desired wear pattern in a hardened surface for optimal sealing between blade tip 54 and topcoat 52.

Figure 5:
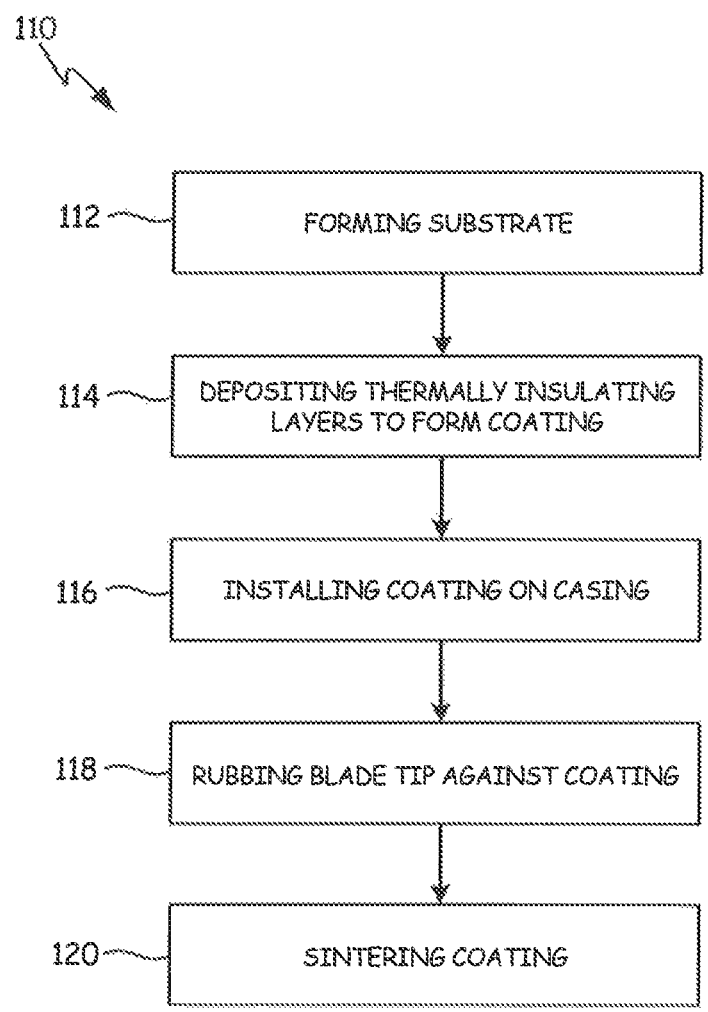
FIG. 5 is a flow diagram illustrating a process of preparing an abradable, durable coating.

FIG. 5 is a flow diagram illustrating a process (110) of preparing an abradable, durable coating with continuing reference to topcoat 52 of FIGS. 3, 4A, and 4B. Preparing an abradable, durable topcoat 52 for a BOAS includes forming substrate 56 (step 112), depositing thermally insulating layers 58 to form coating (step 114), installing coated BOAS in casing (step 116), rubbing blade tip 54 against topcoat 52 (step 118), and converting topcoat 52 (step 120). Step 112 includes forming substrate 56 as described in FIG. 3, with protrusions 60 extending from substrate 56. Step 114 follows step 112 and includes depositing thermally insulating layers 58 to form topcoat 52. Substrate 56 can be a metal alloy or additively manufactured material as discussed in FIG. 3. Thermally insulating layers 58 are deposited over protrusions 60 by thermal spray or other deposition methods to form topcoat 52, which is in an unconverted, intermediate state. In step 116, the coated BOAS is installed in casing 48 of turbine engine 10.

Step 118 follows step 116, and includes rubbing blade tip 54 against topcoat 52. During step 118, topcoat 52 has a high degree of abradability. Rapid acceleration during step 118 creates an initial rub that can produce equal wear to blade tip 54 and topcoat 52. In step 120, turbine engine 10 is run at a steady state high temperature to cause conversion of topcoat 52. Topcoat 52 stays attached to substrate 56 when converted due to protrusions 60 extending from substrate 56. Thus, channel depth D is fixed in topcoat 52. In this manner, the equal wear to blade tip 54 and topcoat 52 is preserved over the life of the engine. Thus, an abradable, durable coating can be formed to provide long-lasting, effective sealing between blade tip 54 and casing 48.

DISCUSSION OF POSSIBLE EMBODIMENTS

The following are non-exclusive descriptions of possible embodiments of the present disclosure.

A method of forming a coating, according to an exemplary embodiment of this disclosure, among other possible things, includes disposing a substrate having a plurality of protrusions on a seal and depositing an abradable topcoat over the protrusions. The method of forming a coating also includes creating a wear pattern and converting the topcoat.

The method of forming a coating of the preceding paragraph can optionally include, additionally and/or alternatively, any one or more of the following features, configurations and/or additional components:

A further embodiment of the foregoing method of forming a coating, wherein the seal is a blade outer air seal.

A further embodiment of any of the foregoing methods of forming a coating, wherein the topcoat comprises a thermally insulating ceramic material having a porosity between 5 and 70 volume percent.

A further embodiment of any of the foregoing methods of forming a coating, wherein the topcoat comprises segmented portions defining a plurality of faults extending from the plurality of protrusions through the topcoat.

A further embodiment of any of the foregoing methods of forming a coating, wherein depositing the topcoat over the plurality of protrusions forms a surface having a plurality of dimples.

A further embodiment of any of the foregoing methods of forming a coating, wherein creating a wear pattern comprises rubbing a blade tip against the topcoat during an initial rub event.

A further embodiment of any of the foregoing methods of forming a coating, wherein rubbing the blade tip against the topcoat during the initial rub phase forms a channel depth that is less than a depth of the plurality of dimples.

A further embodiment of any of the foregoing methods of forming a coating, wherein the wear pattern allows for approximately equal wear to the blade tip and the seal.

A further embodiment of any of the foregoing methods of forming a coating, wherein converting the topcoat comprises running an engine to expose the seal to a surface temperature of at least 1950° F. (1066° C.).

A turbine section, according to an exemplary embodiment of this disclosure, among other possible things, includes a casing, a plurality of blades within the casing, and a substrate deposited on the casing having a plurality of protrusions. The turbine also includes an unconverted topcoat disposed over the plurality of protrusions, the topcoat having segmented portions defining a plurality of faults extending from the protrusions through the topcoat.

The turbine section of the preceding paragraph can optionally include, additionally and/or alternatively, any one or more of the following features, configurations and/or additional components:

A further embodiment of the foregoing turbine section, wherein the plurality of plurality extend from the substrate toward the plurality of blades.

A further embodiment of any of the foregoing turbine sections, wherein the plurality of protrusions extend from the substrate at a substantially uniform height of at least 0.01 inches (0.0254 centimeters).

A further embodiment of any of the foregoing turbine sections, wherein the plurality of faults are gaps located between the plurality of protrusions.

A further embodiment of any of the foregoing turbine sections, wherein the plurality of protrusions forms a grid on the substrate.

A further embodiment of any of the foregoing turbine sections, wherein the topcoat comprises a plurality of dimples corresponding to the shape of the grid on the substrate.

A further embodiment of any of the foregoing turbine sections, wherein the unconverted topcoat comprises a thermally insulating ceramic material.

A further embodiment of any of the foregoing turbine sections, wherein the unconverted topcoat provides a wear pattern configured to allow approximately equal wear to a blade tip and a seal.

A method of forming a coating, according to an exemplary embodiment of this disclosure, among other possible things, includes creating a channel in the coating during an initial rub event and converting the coating during a high-temperature event. Converting the coating includes preserving the channel created during the initial rub event.

The method of forming a coating of the preceding paragraph can optionally include, additionally and/or alternatively, any one or more of the following features, configurations and/or additional components:

A further embodiment of the method of forming a coating, wherein creating a channel in the coating comprises rapidly accelerating the turbine during a green run, causing rubbing of a blade tip against the coating.

A further embodiment of any of the foregoing methods of forming a coating, wherein the high-temperature event comprises running an engine to expose the seal to a surface temperature above 1950° F. (1066° C.).

While the disclosure has been described with reference to an exemplary embodiment(s), it will be understood by those skilled in the art that various changes may be made and equivalents may be substituted for elements thereof without departing from the scope of the disclosure. In addition, many modifications may be made to adapt a particular situation or material to the teachings of the invention without departing from the essential scope thereof. Therefore, it is intended that the disclosure not be limited to the particular embodiment(s) disclosed, but that the disclosure will include all embodiments falling within the scope of the appended claims.

The invention claimed is:

1. A method of forming a coating comprising:
   disposing a substrate having a plurality of protrusions on a seal;
   depositing a topcoat in a soft, unconverted state over the plurality of protrusions, such that depositing the topcoat forms a gas path facing surface of the topcoat having a plurality of dimples formed between adjacent ones of the plurality of protrusions, each dimple of the plurality of dimples having a first depth;
   creating a wear pattern of a channel in the topcoat during an initial rub event by accelerating an engine during a green run by running the engine up to a maximum power to cause a blade tip to rub the topcoat to a second depth that is less than the first depth; and
   converting the topcoat during a high-temperature event;
   wherein converting the topcoat comprises preserving the channel created during the initial rub event.

2. The method of claim 1, wherein the seal is a blade outer air seal.

3. The method of claim 1, wherein the topcoat comprises a thermally insulating ceramic material having a porosity between 5 and 70 volume percent.

4. The method of claim 1, wherein the topcoat comprises segmented portions defining a plurality of faults extending from the plurality of protrusions through the topcoat.

5. The method of claim 1, wherein the wear pattern allows for approximately equal wear to the blade tip and the seal.

6. The method of claim 1, converting the topcoat comprises running an engine to expose the seal to a surface temperature of at least 1950° F. (1066° C.).

\* \* \* \* \*